(12) United States Patent
Chang

(10) Patent No.: US 6,637,182 B1
(45) Date of Patent: Oct. 28, 2003

(54) DETACHABLE RING

(76) Inventor: Vincent Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/144,353

(22) Filed: May 9, 2002

(51) Int. Cl.[7] .............................................. F16G 15/04
(52) U.S. Cl. ........................................................ 59/85
(58) Field of Search ...................................... 59/84, 86

(56) References Cited

U.S. PATENT DOCUMENTS

| | | | | |
|---|---|---|---|---|
| 691,433 A | * | 1/1902 | Baker | 59/85 |
| 755,473 A | * | 3/1904 | Erd, Jr. | 59/85 |
| 1,447,064 A | * | 2/1923 | Cousins | 59/85 |
| 1,454,335 A | * | 5/1923 | Prendergast | 59/85 |

FOREIGN PATENT DOCUMENTS

| | | | | |
|---|---|---|---|---|
| CH | 235344 | * | 4/1945 | 59/85 |
| IT | 346971 | * | 3/1937 | 59/85 |
| JP | 404185938 | * | 6/1992 | 59/85 |

* cited by examiner

*Primary Examiner*—David B. Jones

(57) ABSTRACT

A detachable ring has a safety collar having an inner thread, an annular lower end and a taper upper end, and a main body having a first end having an end flange and a second end having an annular block and an outer thread. The inner thread of the safety collar engages with the outer thread of the second end of the main body. The annular block blocks the annular lower end of the safety collar. The taper upper end of the safety collar encloses the end flange of the first end of the main body.

2 Claims, 7 Drawing Sheets

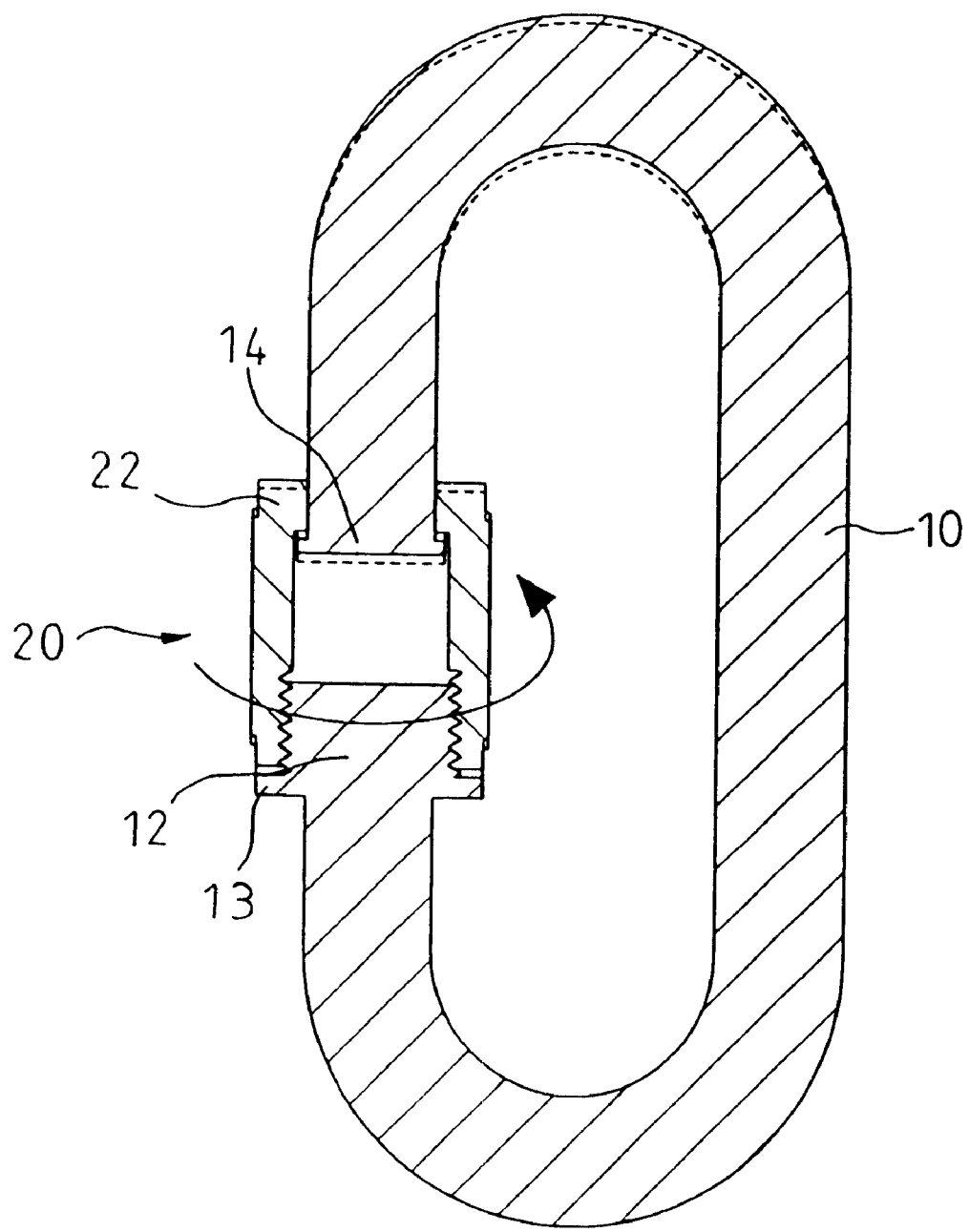
F I G. 5

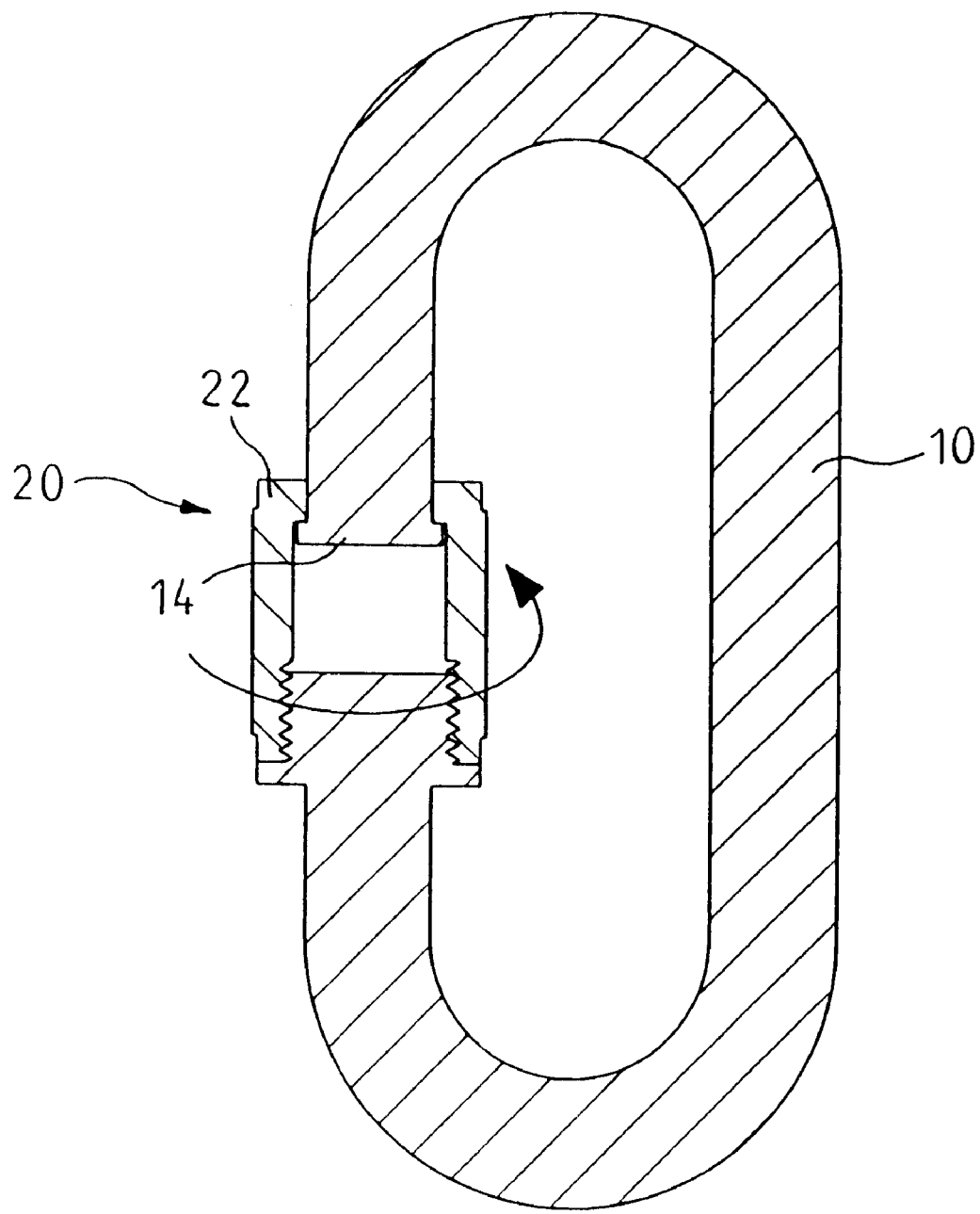
F I G. 6

DETACHABLE RING

BACKGROUND OF THE INVENTION

The present invention relates to a detachable ring. More particularly, the present invention relates to a detachable ring which can be detached easily and quickly.

Referring to FIGS. 1 and 2, a conventional detachable ring has a main body 10', a safety collar 20' having an inner thread 21', and the main body 10' having a first end 101' having an outer thread 11' and a second end 102' having an outer thread 12'. When the safety collar 20' engages with the first end 101' of the main body 10' and the second end 102' of the main body 10', the conventional detachable ring is closed. When the safety collar 20' disengages from the second end 102' of the main body 10', the conventional detachable ring is opened. If the first end 101' of the main body 10' does not match the second end 102' of the main body 10' precisely, the safety collar 20' cannot engage with both the first end 101' of the main body 10' and the second end 102' of the main body 10' at the same time. When the conventional detachable ring is opened, the safety collar 20' should disengages from both the second end 102' of the main body 10' and the first end 101' of the main body 10' slowly.

SUMMARY OF THE INVENTION

An object of the present invention is to provide a detachable ring which can be detached easily and quickly.

Accordingly, a detachable ring comprises a safety collar having an inner thread, an annular lower end and a taper upper end, and a main body having a first end having an end flange and a second end having an annular block and an outer thread. The inner thread of the safety collar engages with the outer thread of the second end of the main body. The annular block blocks the annular lower end of the safety collar. The taper upper end of the safety collar encloses the end flange of the first end of the main body.

BRIEF DESCRIPTION OF THE DRAWINGS

FIG. 5 is a sectional view of a detachable ring of a preferred embodiment in accordance with the present invention;

FIG. 6 is a schematic view illustrating an operation of a detachable ring of a preferred embodiment in accordance with the present invention.

DETAILED DESCRIPTION OF THE INVENTION

Figure 1:
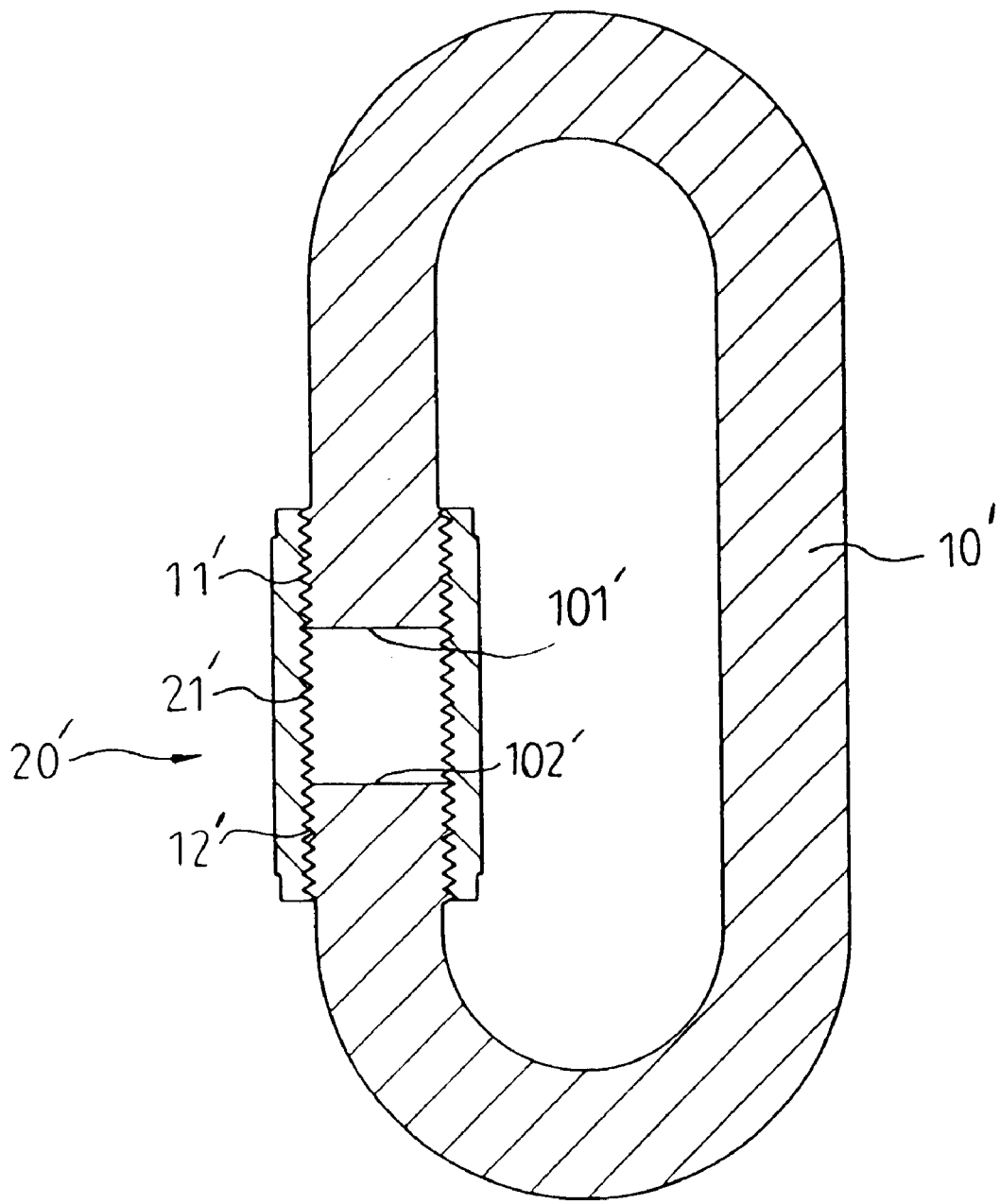
FIG. 1 is a sectional view of a conventional detachable ring of the prior art.
Figure 2:
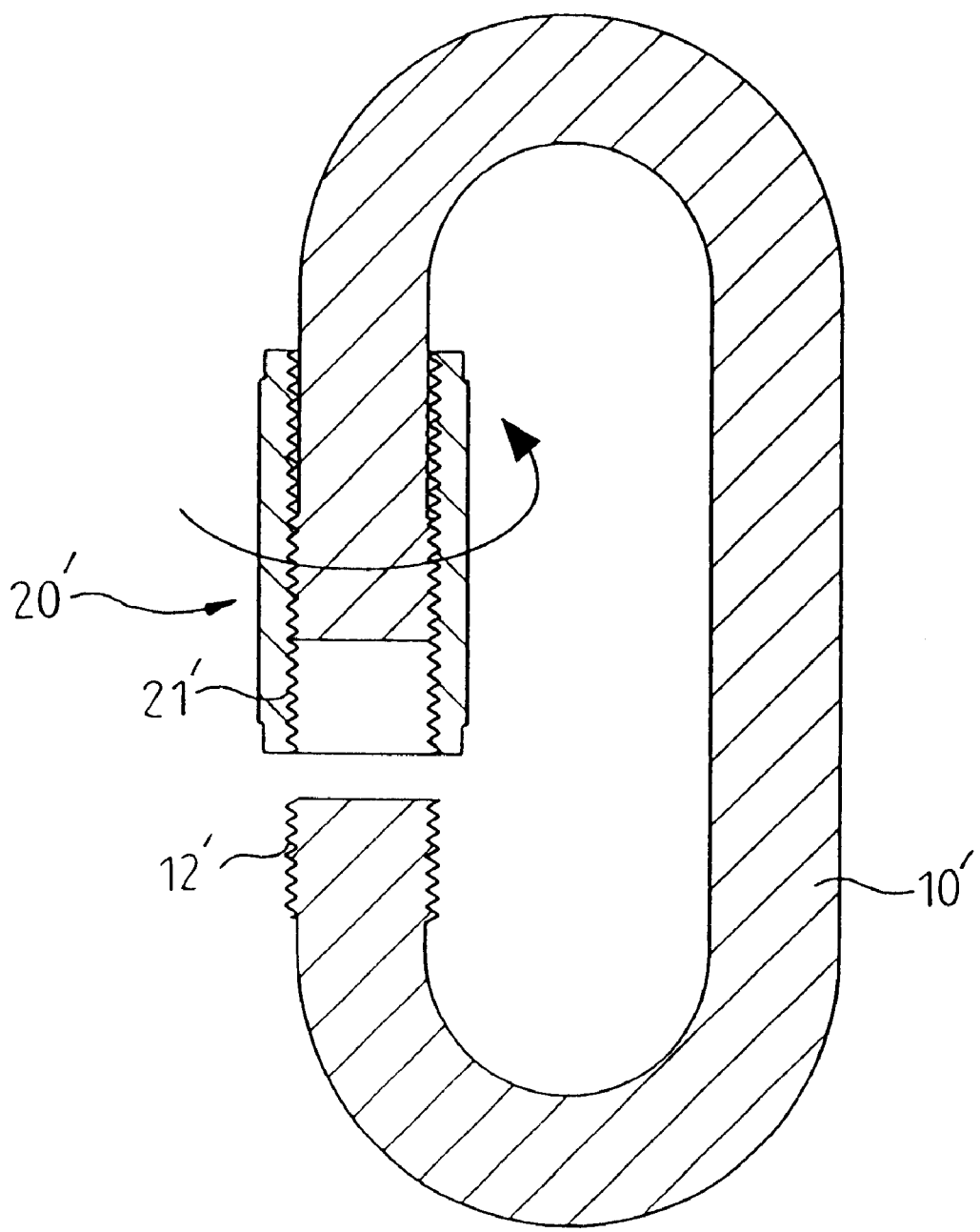
FIG. 2 is a schematic view illustrating an operation of a conventional detachable ring of the prior art.
Figure 3:
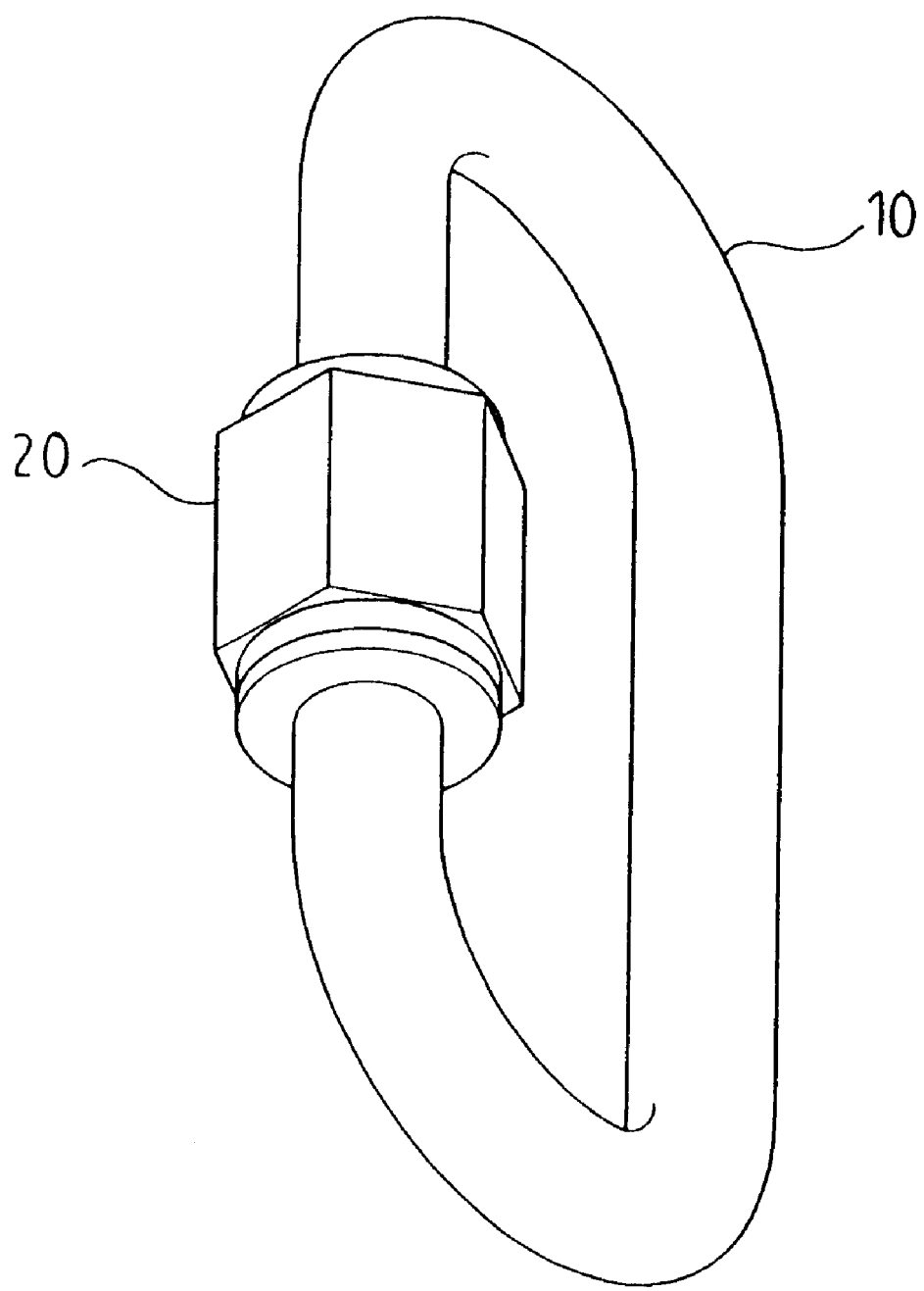
FIG. 3 is a perspective assembly view of a detachable ring of a preferred embodiment in accordance with the present invention.
Figure 4:
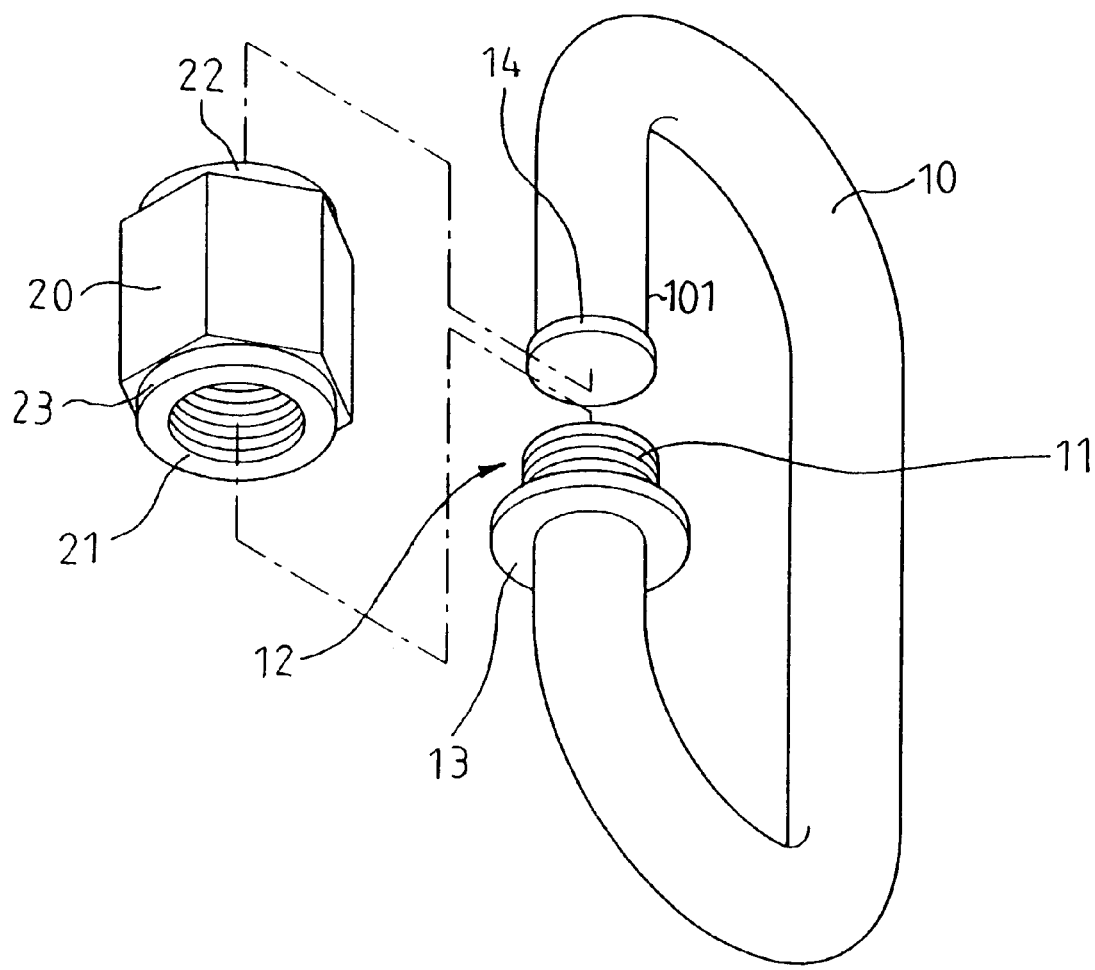
FIG. 4 is a perspective exploded view of a detachable ring of a preferred embodiment in accordance with the present invention.
Figure 7:
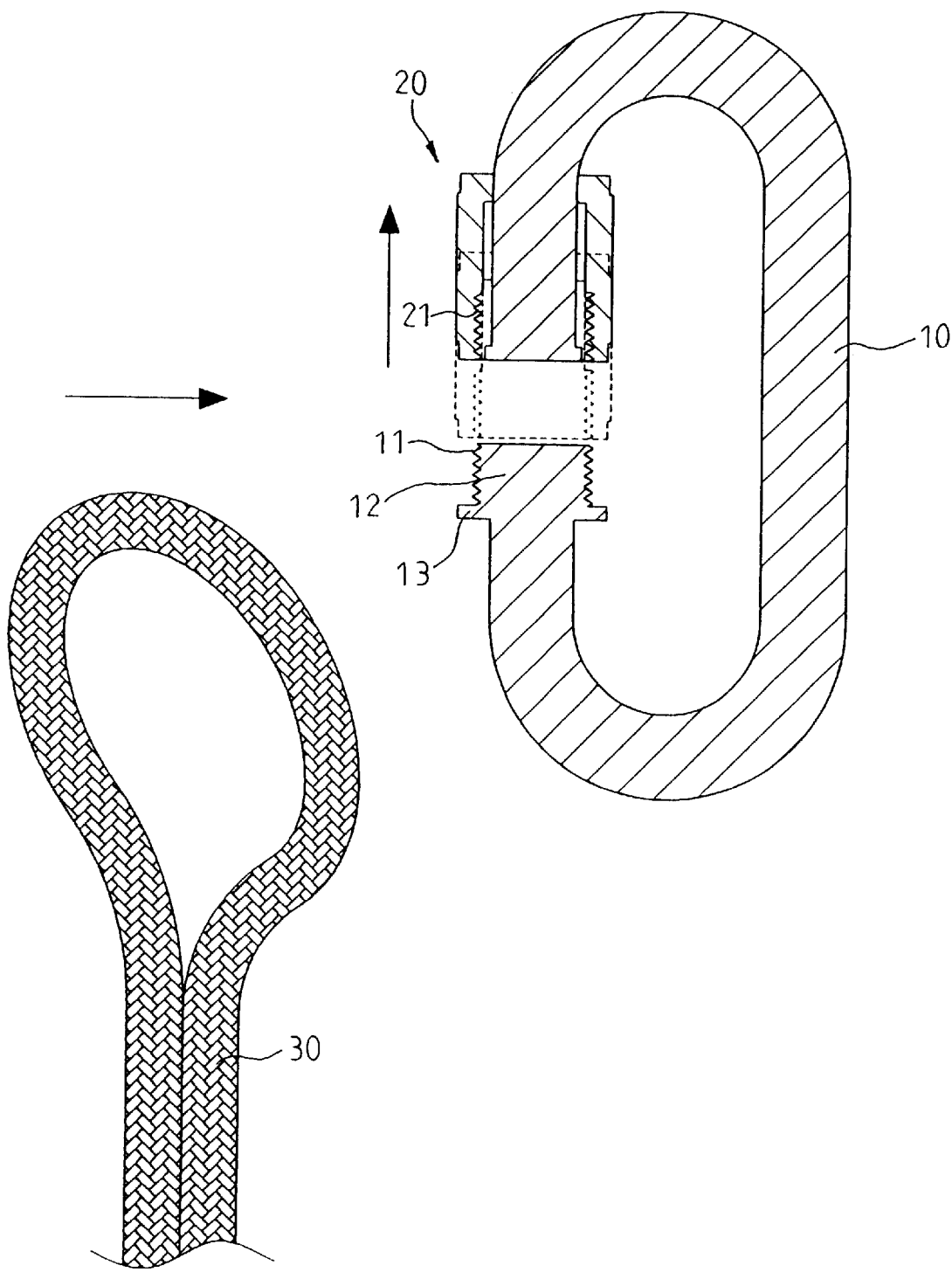
FIG. 7 is a schematic view illustrating an application of a detachable ring of a preferred embodiment in accordance with the present invention.

Referring to FIGS. 3 to 7 first, a detachable ring comprises a main body 10, a safety collar 20 having an inner thread 21, an annular lower end 23 and a taper upper end 22, and the main body 10 having a first end 101 having an end flange 14 and a second end 12 having an annular block 13 and an outer thread 11.

The inner thread 21 of the safety collar 20 engages with the outer thread 11 of the second end 12 of the main body 10.

The annular block 13 blocks the annular lower end 23 of the safety collar 20.

The taper upper end 22 of the safety collar 20 encloses the end flange 14 of the first end 101 of the main body 10.

The detachable ring is made of a metal.

Referring to FIGS. 5 to 7 again, the safety collar 20 disengages from the second end 12 of the main body 10. A rope 30 is hooked by the detachable ring.

The invention is not limited to the above embodiment but various modification thereof may be made. Further, various changes in form and detail may be made without departing from the scope of the invention.

I claim:

1. A detachable ring comprises:

a safety collar having an inner thread, the safety collar having a first end and a second end, a main body having a first end having an end flange and a second end having an enlarged block and an outer thread, the inner thread of the safety collar engaging with the outer thread of the second end of the main body, the enlarged block of the second end of the main body blocking the second end of the safety collar, and the first end of the safety collar enclosing the end flange of the first end of the main body.

2. The detachable ring as claimed in claim 1, wherein the safety collar an inner wall having a length smaller than a distance between the end flange of the first end of the main body and the enlarged block of the second end of the main body, such that when the safety collar is screwed on the main body until the second end of the safety collar is rested on the enlarged block of the second end of the main body, the distance between the end flange of the first end of the main body and the enlarged block of the second end of the main body is reduced.

* * * * *